United States Patent
Shah et al.

(10) Patent No.: US 9,335,928 B2
(45) Date of Patent: May 10, 2016

(54) USING UNUSED PORTION OF THE STORAGE SPACE OF PHYSICAL STORAGE DEVICES CONFIGURED AS A RAID

(75) Inventors: Dhaval K. Shah, Nadiad (IN); Ganesh Sivaperuman, Washermenpet (IN); Gaurav Chhaunker, Hyderabad (IN); Muthu A. Muthiah, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 13/251,238

(22) Filed: Oct. 1, 2011

(65) Prior Publication Data

US 2013/0086316 A1    Apr. 4, 2013

(51) Int. Cl.
| | |
|---|---|
| G06F 12/08 | (2006.01) |
| G06F 12/00 | (2006.01) |
| G06F 3/06 | (2006.01) |
| G06F 11/10 | (2006.01) |

(52) U.S. Cl.
CPC ............ *G06F 3/0608* (2013.01); *G06F 3/0631* (2013.01); *G06F 3/0644* (2013.01); *G06F 3/0689* (2013.01); *G06F 11/1092* (2013.01); *G06F 12/0866* (2013.01); *G06F 2211/1023* (2013.01); *G06F 2212/224* (2013.01); *G06F 2212/262* (2013.01)

(58) Field of Classification Search
CPC ...... G06F 3/0619; G06F 3/0688; G06F 3/048; G06F 3/065; G06F 11/1446
See application file for complete search history.

(56) References Cited

U.S. PATENT DOCUMENTS

| | | | |
|---|---|---|---|
| 6,629,211 | B2 | 9/2003 | McKnight et al. |
| 7,321,955 | B2 * | 1/2008 | Ohmura ............... 711/136 |
| 7,434,090 | B2 | 10/2008 | Hartung et al. |
| 7,512,736 | B1 * | 3/2009 | Overby ............... 711/114 |
| 8,230,193 | B2 * | 7/2012 | Klemm et al. ............ 711/165 |
| 2005/0125607 | A1 * | 6/2005 | Chefalas et al. ......... 711/113 |
| 2009/0013213 | A1 | 1/2009 | Kalman et al. |
| 2009/0228648 | A1 * | 9/2009 | Wack ............... 711/114 |
| 2010/0050016 | A1 * | 2/2010 | Franklin et al. ............ 714/7 |
| 2010/0287408 | A1 | 11/2010 | Kopylovitz |
| 2011/0197024 | A1 * | 8/2011 | Thomas ............... 711/114 |
| 2012/0290788 | A1 * | 11/2012 | Klemm et al. ............ 711/114 |
| 2013/0007373 | A1 * | 1/2013 | Beckmann et al. ......... 711/136 |
| 2013/0067161 | A1 * | 3/2013 | Chandra et al. ............ 711/114 |

* cited by examiner

*Primary Examiner* — Sanjiv Shah
*Assistant Examiner* — Mohamed Gebril
(74) *Attorney, Agent, or Firm* — Steven Bennett (57) ABSTRACT

Physical storage devices are configured as a redundant array of independent disks (RAID). As such, storage space of the physical storage devices is allocated to the RAID, and each physical storage device is part of the RAID. Where a portion of the storage space of the physical storage devices is not allocated to the RAID, this portion of the storage space from a mixed drive capacity is configured so that it is usable and is not wasted.

18 Claims, 5 Drawing Sheets

USING UNUSED PORTION OF THE STORAGE SPACE OF PHYSICAL STORAGE DEVICES CONFIGURED AS A RAID

BACKGROUND

Physical storage devices include hard disk drives and solid state drives (SSDs). Computing devices, like computers, store data on such physical storage devices. For redundancy, reliability, and/or performance, a number of physical storage devices can be configured as a redundant array of independent disks (RAID). A RAID including such a number of physical storage devices acts as a single logical storage volume. There are a number of different RAID levels, such as RAID-0, RAID-1, RAID-5, and so on, which correspond to different types of array configurations of physical storage devices, to provide for different goals, such as redundancy, reliability, and/or performance, as noted above.

SUMMARY

A method of an embodiment of the invention includes configuring, by a device, physical storage devices as a redundant array of independent disks (RAID). Storage space of the physical storage devices is allocated to the RAID, and each physical storage device is part of the RAID. Where a portion of the storage space of the physical storage devices is not allocated to the RAID, the method includes configuring the portion of the storage space, by the device, so that the portion of the storage space is usable and is not wasted.

A system of an embodiment of the invention includes physical storage devices configurable as a RAID. Upon configuration of the physical storage devices as the RAID, storage space of the physical storage devices is allocated to the RAID and each physical storage device is part of the RAID. The system includes a controller to, where upon configuration of the physical storage devices as the RAID a portion of the storage space of the physical storage devices is not allocated to the RAID, configure the portion of the storage space so that the portion of the storage space is usable and is not wasted.

A hardware controller of an embodiment of the invention is for physical storage devices configurable as a RAID. Upon configuration of the physical storage devices as the RAID, storage space of the physical storage devices is allocated to the RAID and each physical storage device is part of the RAID. The hardware controller includes a unit implemented in hardware. The unit is to, where upon configuration of the physical storage devices as the RAID a portion of the storage space of the physical storage devices is not allocated to the RAID, configure the portion of the storage space so that the portion of the storage space is usable and not wasted.

A computer program product of an embodiment of the invention includes a computer-readable storage medium having computer-readable code embodied therein. The computer-readable code is executable by a processor in relation to physical storage devices configurable as a RAID. Upon configuration of the physical storage devices as the RAID, storage space of the physical storage devices is allocated to the RAID and each physical storage device is part of the RAID. The computer-readable code is to, where upon configuration of the physical storage devices as the RAID a portion of the storage space of the physical storage devices is not allocated to the RAID, configure the portion of the storage space so that the portion of the storage space is usable and not wasted.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, a number of physical storage devices can be configured as a redundant array of independent disks (RAID). In general, a RAID is configured to use an amount of the storage size of each physical storage device that is equal to the storage size of the physical storage device within the array that has the smallest storage size. In this respect, it is generally recommended to have physical storage devices of equal storage size when configuring the devices as a RAID, to avoid unused and wasted storage space on the storage devices.

For instance, consider a scenario where there are two hard disk drives to be configured as a RAID in accordance with RAID-1. RAID-1 specifies that data stored on one drive is mirrored to another drive for redundancy. If one of the hard disk drives is larger in storage size than the other hard disk drive, then the extra capacity of the larger hard disk drive is wasted. For example, if one hard disk drive can store fifty gigabytes (GB) of data, and the other hard disk drive can store seventy GB of data, then twenty GB of the latter drive is wasted when configuring the two disk drives as a RAID-1.

Also consider a scenario where there are three hard disk drives to be configured as a RAID in accordance with RAID-5. RAID-5 specifies that data stored within the RAID is stored over the hard disk drives in such a manner that if any one drive fails, the RAID can be rebuilt when a replacement hard drive is added, without any loss of data. The extra capacity of each hard disk drive over the storage size of the hard disk drive within the array that has the smallest storage size is wasted. For example, if two hard disk drives can each store seventy GB of data, and the third hard disk drive can store fifty GB of data, then twenty GB of each of the former two drives is wasted, for a total wasted storage space of forty GB, when the three disk drives are configured as a RAID-5.

The techniques disclosed herein take advantage of this wasted and otherwise unused storage space of physical storage devices that are configured as a RAID. In particular, any portion of the storage space of the physical storage devices that is not allocated to the RAID is configured so that it is usable and not wasted. In the first example described above, the twenty GB that would otherwise be wasted is configured to be usable, and in the second example described above, the forty GB that would otherwise be wasted is configured to be usable. Different approaches for using this otherwise wasted storage space are presented herein.

Figure 1:
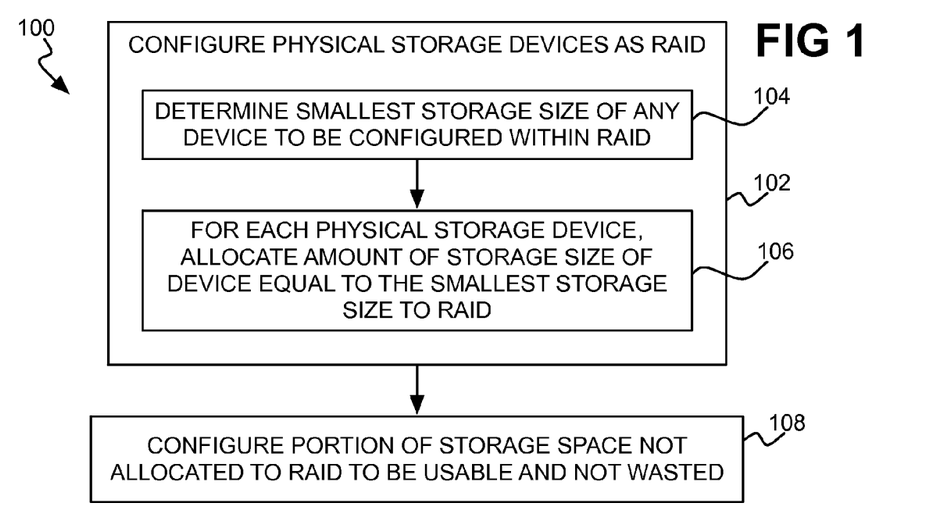
FIG. 1 is a flowchart of a method, according to an embodiment of the present invention.

FIG. 1 shows a method 100, according to an embodiment of the invention. A device performs the method 100. For instance, the device may be a computing device, like a computer, a storage device to be connected to a computer, and so on. The device may include computer-readable code that a processor executes to perform the method 100. Alternatively, the device may include a hardware controller that is hard-coded to perform the method 100.

A number of physical storage devices are configured as a RAID (102). Storage space of the physical storage devices is allocated to the RAID. In particular, each physical storage device becomes part of the RAID. Examples of physical storage devices include hard disk drives and solid-state devices (SSDs). The RAID may be RAID-0, RAID-1, RAID-5, or another type of RAID, depending on whether redundancy, reliability, and/or performance is desired with the RAID.

In one embodiment, configuration of the physical storage devices as a RAID can include the following. First, a given physical storage device that has a storage size no greater than that of any other physical storage device that is to be part of the RAID is determined (104). This is the smallest physical storage device from a storage size perspective. The storage size of this physical storage device is referred to as the smallest storage size of any physical storage device to become part of the RAID.

Second, for each physical storage device, an amount of the storage size of the device is allocated to the RAID that is equal to the smallest storage size that has been determined (106). As such, for each physical storage device, if any, that has a storage size greater than the smallest storage size, there is a first amount of this storage size allocated to the RAID, and a second amount that is not allocated to the RAID. The second amount plus the first amount is equal to the storage size of the physical storage device in question. For each physical storage device that has a storage size equal to the smallest storage size, the second amount is zero, because the entirety of the storage size is allocated to the RAID.

Figure 2:
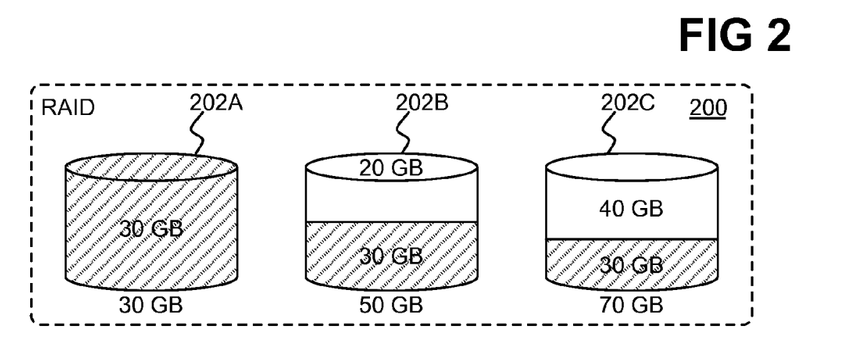
FIG. 2 is a diagram of an example redundant array of independent disks (RAID) showing unused and wasted storage space that can be configured to be used and not wasted, according to an embodiment of the invention.

FIG. 2 shows an example RAID 200 that is configured pursuant to part 102 of the method 100, according to an embodiment of the invention. The RAID 200 includes three physical storage devices 202A, 202B, and 202C, which are collectively referred to as the physical storage devices 202. The physical storage devices 202 have storage sizes of thirty GB, fifty GB, and seventy GB, respectively.

The physical storage device 202A is the given storage device having the smallest storage size. Therefore, thirty GB of the storage size of each of the other two physical storage devices 202B and 202C is allocated to the RAID 200, whereas all the storage size of the physical storage device 202A is allocated to the RAID 200. Allocation to the RAID 200 is indicated in FIG. 2 by shading.

Although all of the thirty GB of storage size of the physical storage device 202A is allocated to the RAID 200, not all of the storage size of each of the physical storage devices 202B and 202C is. Rather, 50 GB–30 GB=20 GB of the storage size of the physical storage device 202B remains unallocated to the RAID 200, and thus is unused and wasted storage space. Similarly, 70 GB–30 GB=40 GB of the storage size of the physical storage device 202C remains unallocated to the RAID 200, and is also unused and wasted storage space.

Referring back to FIG. 1, where there is any portion of the storage space of the physical storage devices that is not allocated to the RAID, this portion of the storage space is configured so that it is usable and not wasted (108). In the example of FIG. 2, for instance, there is a sixty GB portion of the total 30 GB+50 GB+70 GB=150 GB of storage space of the physical storage devices 202 (twenty GB from the device 202B and forty GB from the storage device 202C) that is not allocated to the RAID 200. Therefore, in part 108, this portion of the storage space of the physical storage devices 202 is configured to be usable and not wasted.

In one embodiment, the portion of the storage space of the physical storage devices that is not allocated to the RAID is allocated to another, separate RAID in part 108. As such, at least some of the physical storage devices are part of two RAIDs—a first RAID of all the physical storage devices that is configured in part 102, and a second RAID of some but not all the devices that is configured in part 108. The second RAID may be a RAID-0 or any other type of RAID.

Figure 3:
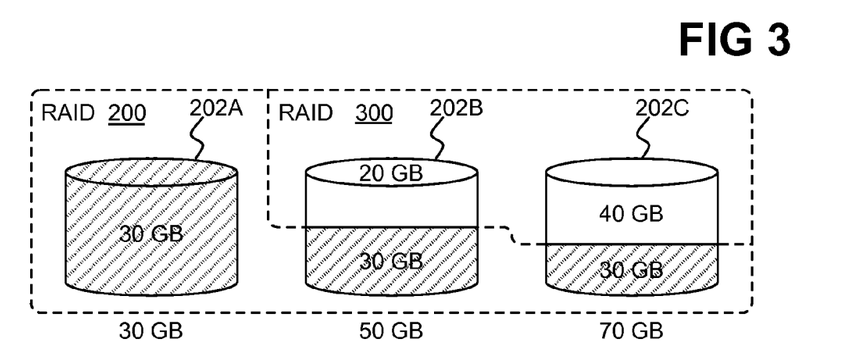
FIG. 3 is a diagram of the example RAID of FIG. 2 in which the unused and wasted storage space is configured to be used and not wasted, according to an embodiment of the invention.

FIG. 3 shows the example physical storage devices 202 after performance of part 108 of the method 100, according to this embodiment of the invention. The RAID 200 includes all three physical storage devices 202, as before. However, twenty GB of the physical storage device 202B and forty GB of the physical storage device 202C remain unused and wasted within the RAID 200.

Therefore, another RAID 300 is configured to include the physical storage devices 202B and 202C, specifically to use the twenty GB of the storage device 202B and the forty GB of the storage device 202C that is not allocated to the RAID 200. As noted above, however, RAID generally can only use the storage size of each physical storage device equal to the smallest storage size of any storage device. As such, in the example of FIG. 3, twenty GB of the storage size of the physical storage device 202C may remain wasted and unused even within the RAID 300. That is, just twenty GB of the physical storage device 202C may be allocated to the RAID 300, since just twenty GB of the physical storage device 202B is available for allocation to the RAID 300. The remaining unallocated twenty GB of the physical storage device 202C may be configured in a still different way, an example of which is described later in the detailed description.

Figure 4:
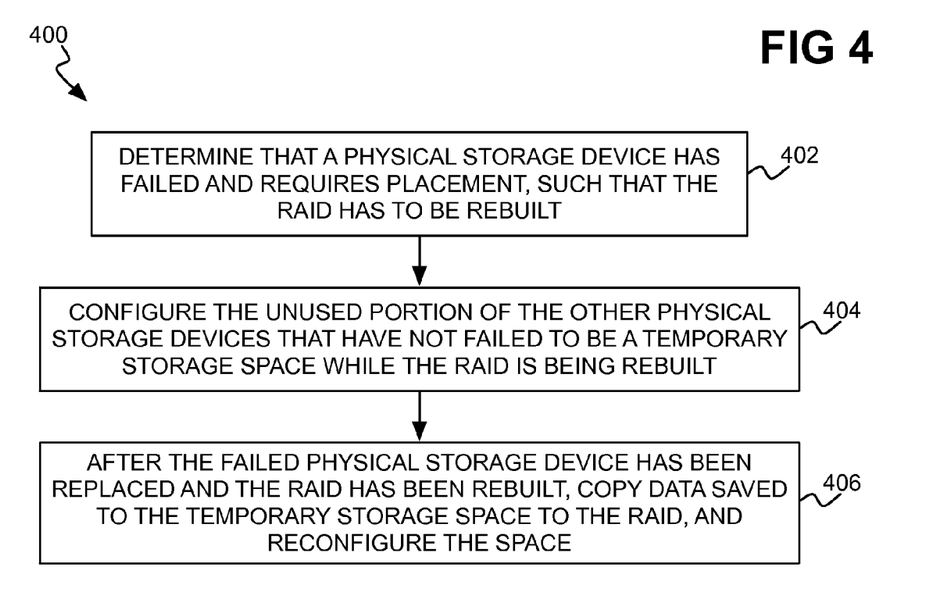
FIG. 4 is a flowchart of a method to configure a portion of storage space not allocated to a RAID to be usable and not wasted, according to an embodiment of the invention.

FIG. 4 shows a method 400 by which the portion of the storage space of the physical storage devices not allocated to a RAID may be configured to be usable and not wasted in part 108 of the method 100, according to another embodiment of the invention. The method 400 presents a particular scenario that is subsequently generalized. It is thus specifically noted that when a physical storage device of a RAID fails, a new storage device replaces the storage device, and the RAID rebuilt such that no data is lost. However, the rebuilding process can take quite some time, and during this time, access to the RAID is generally slow. The method 400 contemplates a scenario in which the unused storage device that is not allocated to the RAID is used on a temporary basis until the RAID has been rebuilt.

Specifically, the method 400 determines that a physical storage device of the RAID has failed and requires replacement such that the RAID then has to be rebuilt (402). Responsive to this determination, and upon a replacement physical storage device being installed in place of the failed storage device, the unused portion of the other physical storage devices that have not failed is configured to be a temporary storage space while the RAID is being rebuilt (404). Therefore, after the failed physical storage device has been replaced and after the RAID has been rebuilt, any data saved to this temporary storage space is copied to the RAID (406). This space can then be reconfigured so that it once again is no longer usable.

Figure 5:
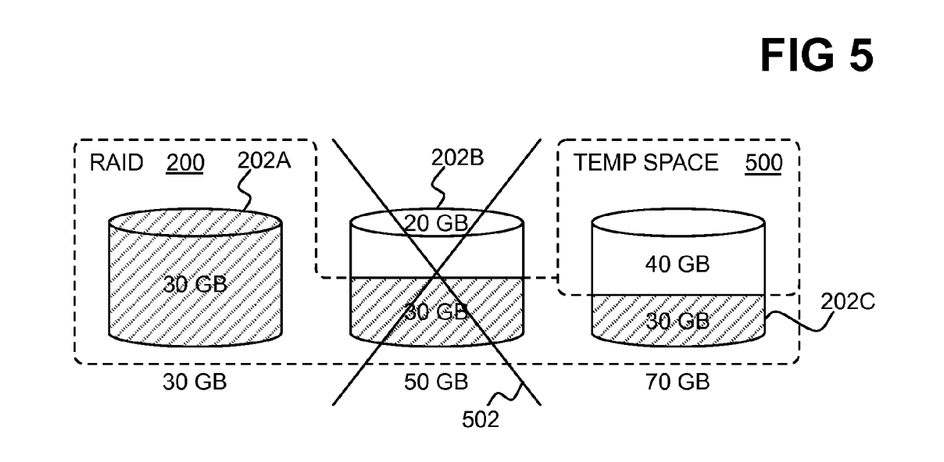
FIG. 5 is a diagram of the example RAID of FIG. 2 in which the unused storage space is configured to be used and not wasted in accordance with the method of FIG. 4, according to an embodiment of the invention.

FIG. 5 shows the RAID 200 of the physical storage devices 202 of FIG. 2 upon performance of the method 400, according to an embodiment of the invention. As before, the RAID 200 includes the storage devices 202. More specifically, the entire thirty GB of the physical storage device 202A is allocated to the RAID 200, whereas just thirty GB of the fifty GB of the storage device 202B and just thirty GB of the seventy GB of the device 202C are allocated to the RAID 200.

In the example of FIG. 5, it is presumed that the physical storage device 202B has failed, as indicated by the storage device 202B being crossed out by an X 502 in FIG. 5. Therefore, the storage device 202B has to be replaced, and the RAID 200 rebuilt. During this rebuilding process, the forty GB of the physical storage device 202C that is not allocated to the RAID 200 is configured to serve as a temporary storage space 500. Once the RAID 200 has been rebuilt, the data stored within this space 500 is copied to the RAID 200, and the temporary storage space 500 can be reconfigured so that the forty GB of the physical storage device 202C is no longer usable.

In general, the method 400 is a process by which the portion of the storage space of the physical storage devices that is not allocated to the RAID can be temporarily configured to become a temporary storage space that one or more computer programs running on a computing device may require. As such, in part 404, this portion of the storage space is generally said to be configured to be usable by at least these computer programs, as the temporary storage space in question. Once the computer programs no longer require the temporary storage space, then this portion of the storage space is reconfigured so that it is no longer usable by the computer programs, in part 406.

As noted above in relation to FIG. 3, when the portion of the storage space of the physical storage devices that is not allocated to the RAID is configured as another RAID in part 108 of the method 100, there can still remain storage space that is unallocated to either the first RAID or the second RAID. Therefore, in one embodiment, the configuration process is iterative, such that additional RAIDs are successively configured from the remaining storage space until no further RAIDs can be set up. If there is still remaining storage space on just one physical storage device after such multiple RAIDs have been configured, then a non-RAID logical volume may be configured so that no storage space remains unusable and wasted.

Figure 6:
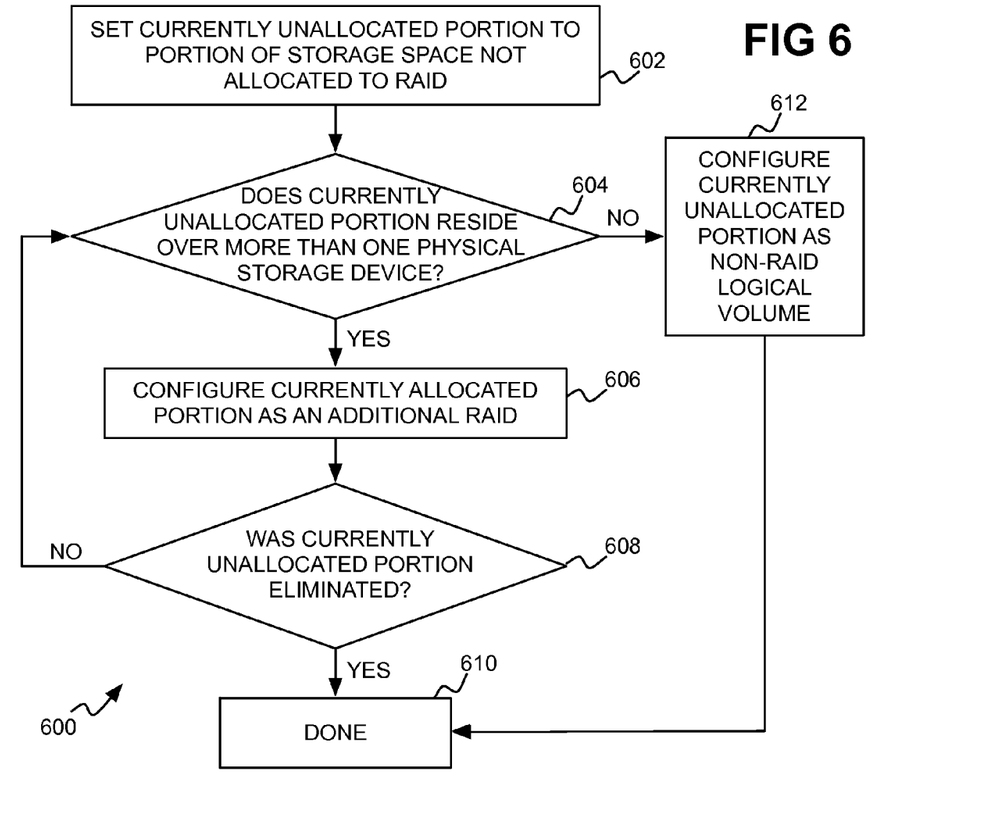
FIG. 6 is a flowchart of a method to configure a portion of storage space not allocated to a RAID to be usable and not wasted, according to another embodiment of the invention.

FIG. 6 shows a method 600 by which the portion of the storage space of the physical storage devices not allocated to a RAID may be configured to be usable and not wasted in part 108 of the method 100, according to such an embodiment of the invention. What is referred to as a currently unallocated portion of storage space of the physical storage devices is initially set to the portion of the storage space that was not allocated to the RAID in part 102 of the method 100 (602). Therefore, the method 600 performs the following.

If the currently unallocated portion resides over more than one physical storage device (604), then this currently unallocated portion is configured as an additional RAID (606). This configuration reduces or eliminates the currently unallocated portion of storage space on the physical storage devices. If after the additional RAID is configured no storage space remains unallocated to any RAID on any physical storage device, then it is said that the currently unallocated portion has been eliminated. However, as has been described above in relation to FIG. 3, in some situations even after the configuration of an additional RAID there may still remain unallocated storage space on one or more physical storage devices. In this case, it is said that the currently unallocated portion has been reduced, but not eliminated, via the configuration of the additional RAID in part 606.

If the configuration of this additional RAID completely eliminated the currently unallocated portion (608), then the method 600 is finished (610). Otherwise, the method 600 is repeated at part 604. As such, multiple additional RAIDs can be configured over successive iterations of part 606.

However, at some point, the currently unallocated portion of storage space may reside on just one physical storage device, as was the case in the example of FIG. 3 described above. In this case, the method 600 can proceed from part 604 to part 612. The currently unallocated portion residing on just one physical storage device is configured as a non-RAID logical volume (612), and the method 600 is finished (610). It is noted in this respect that by definition, a RAID requires more than one physical storage device. Therefore, if the currently unallocated portion of storage space resides on just one physical storage device, then by definition a RAID cannot be configured from this remaining storage space, which is why part 612 can be performed instead.

The configuration of the currently unallocated portion of storage space as an additional, new RAID in part 606 of the method 600 can be performed in a number of different ways. For instance, the currently unallocated portion of storage space can be configured in a manner that maximally—or greedily—uses the currently unallocated portion of storage space. That is, the largest possible amount or share of the currently unallocated portion is configured as the additional RAID in each iteration of part 606 in this embodiment.

Figure 7:
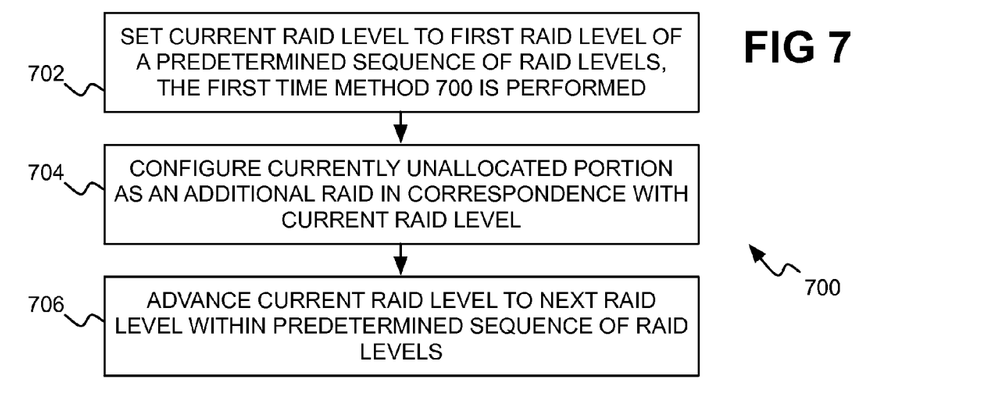
FIG. 7 is a flowchart of a method to configure an additional RAID from a currently unallocated portion of storage space in the method of FIG. 6, according to an embodiment of the invention.

Additionally or alternatively, FIG. 7 shows a method 700 by which the currently unallocated portion of storage space is configured as an additional, new RAID in part 606 of the method 600, according to an embodiment of the invention. The first time the method 700 is performed, what is referred to as a current RAID level is set to the first RAID level of a predetermined sequence of RAID levels (702). The predetermined sequence of RAID levels governs the RAIDs that are to be configured from the currently unallocated portion of storage space over successive iterations of part 606 of the method 600.

For example, the predetermined sequence of RAID levels may be RAID-5, RAID-1, and RAID-0. The first RAID level in this sequence is RAID-5, such that the current RAID level is set to RAID-5 in part 702. The currently unallocated portion of the storage space is thus configured as an additional RAID in correspondence with the current RAID level (704), which in the example is RAID-5. Thereafter, the current RAID level may be advanced to the next RAID level within the predetermined sequence (706), which in the example is RAID-1. Therefore, the next time the method 700 is performed to implement part 606 of the method 600, the additional RAID is configured as a RAID-1, and so on.

The approach of the method 700 may be modified so that a current RAID level is not advanced through the predetermined sequence of RAID levels during successive iterations of the method 700. Rather, the predetermined sequence of RAID levels can instead be employed to govern the preference of RAID levels that are to be configured. Each time the method 700 is performed in this embodiment, the currently unallocated portion is configured as an additional RAID in correspondence with the highest RAID level within the predetermined sequence.

For example, if the sequence specifies that RAID-5 is higher than RAID-1, then each time the method 700 is performed, the additional RAID is configured as a RAID-5 if at all possible, and otherwise, the additional RAID is configured as a RAID-1. It is noted, for instance, that RAID-5 requires the currently unallocated portion of storage space to reside on at least three physical storage devices, whereas RAID-1 requires the currently unallocated portion of storage space to reside on just two such storage devices. In this embodiment, for example, a RAID-5 may be configured the first and second times the method 700 is performed, and a RAID-1 may be configured the third time the method 700 is performed.

In this embodiment, parts 702 and 706 of the method 700 are not performed, but rather just part 704 is. Other embodiments of the invention may specify more complex predetermined sequences and other manners by which the type and even size of each additional RAID is configured. For example, extensive policies and rules may govern the type and size of each additional RAID to be configured, based on the number of physical storage devices over which the currently unallocated portion of storage space resides, based on the size of the currently unallocated portion, based on the storage size of each physical storage device that is not currently unallocated, and/or based on other factors, characteristics, and/or parameters.

Figure 8:
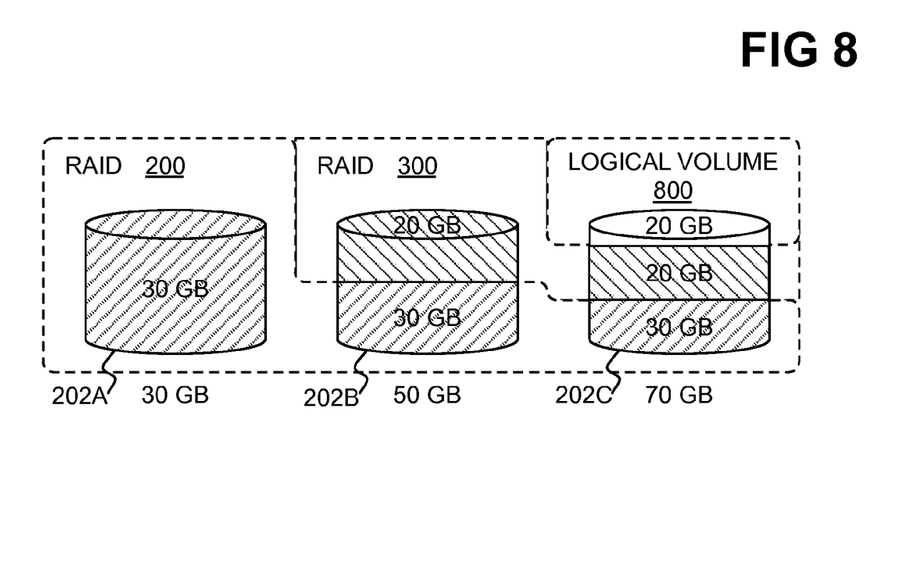
FIG. 8 is a diagram of the example RAID of FIG. 2 in which the unused storage space is configured to be used and not wasted in accordance with the method of FIG. 7, according to an embodiment of the invention.

FIG. 8 shows the example physical storage devices 202 after performance of the method 600, according to an embodiment of the invention. The RAID 200 includes all three physical storage devices 202, as before. However, twenty GB of the physical storage device 202B and forty GB of the physical storage device 202C remain unused and wasted within the RAID 200. Therefore, the method 600 sets the currently unallocated portion in part 602 to this sixty GB residing on the physical storage devices 202B and 202C.

Thereafter, the method 600 proceeds from to part 604 to part 606, in which the RAID 300 may be configured, as in FIG. 3 that has been described. The RAID 300 includes the twenty GB of the physical storage device 202B that was not allocated to the RAID 200, and 20 GB of the forty GB of the physical storage device 202C that was not allocated to the RAID 200. After part 606 has been performed, the currently unallocated portion that is not allocated to either the RAID 200 or the RAID 300 is reduced to twenty GB on just the physical storage device 202C.

The method 600 therefore proceeds from part 608 back to part 604, and then to part 612. In part 612, the currently unallocated portion is configured as a non-RAID logical volume. In FIG. 8, the logical volume 800 is thus configured to include the twenty GB of unallocated storage space that remains on just the physical storage device 202C. The method 600 is then finished at part 610.

Figure 9:
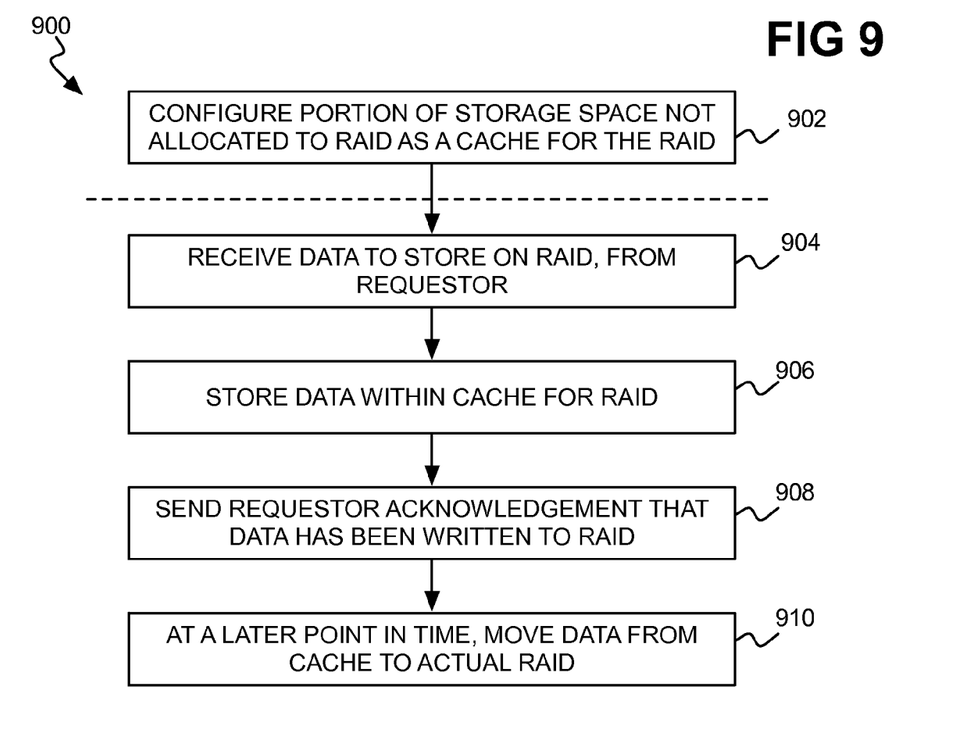
FIG. 9 is a flowchart of a method to configure a portion of storage space not allocated to a RAID to be usable and not wasted, according to still another embodiment of the invention.

FIG. 9 shows a method 900 by which the portion of the storage space of the physical storage devices not allocated to a RAID may be configured to be usable and not wasted in part 108 of the method 100, according to another embodiment of the invention. The method 900 uses the portion of the storage space that is not allocated to a RAID as a cache for the RAID. Some types of RAID, such as RAID-5 and RAID-1, exhibit performance penalties when writing data to the RAID. This can be because data has to be written to more than one physical storage device, among other reasons. By comparison, other types of RAID, such as RAID-0, exhibit performance bonuses when writing data to the RAID, since a portion of the data is written to one physical storage device, and another portion of the data is written to a different physical storage device.

The method 900 therefore configures the portion of storage space not allocated to the RAID that was configured in part 102 of the method 100 as a cache for the RAID (902). Part 902 serves to implement part 108 of the method 100. Parts 904, 906, 908, and 910 of the method 900 can be considered as additional, subsequent parts of the method 100, by comparison.

Data that is to be stored on the RAID is received from a requestor (904). The requestor may be a computer program, a computing device, and so on. The method 900 stores the data within the cache for the RAID (906), instead of immediately on the RAID itself. However, the method 900 reports back to the requestor that the data has been written to the RAID (908), even though the data has not yet been written to the RAID. At a later point in time, the method 900 moves the data from the cache to the actual RAID in question (910).

The method 900 thus provides for an increase in performance predicated on the assumption that writing data to the cache is quicker than writing data to the RAID itself. Therefore, the requestor does not have to wait as long to receive an acknowledgment that the data has been written. Periodically, or when the RAID is not actively being used, the method 900 may flush the cache, moving the data from the cache to the RAID itself.

FIG. 3 that has been described above also illustrates an example of this embodiment of the invention. The RAID 300 can serves as a cache for the RAID 200. The RAID 200 may be a RAID-5, for instance, whereas the RAID 300 may be a RAID-0. As such, the method 900 can write data to the RAID 300 more quickly than it can to the RAID 200. Data to be written to the RAID 200 is first written instead to the RAID 300 to realize an increase in performance. At some point later in time, the data is moved from the RAID 300 to the RAID 200.

It is noted, however, that the cache that is configured in accordance with the method 900 does not have to be a RAID. For example, if the portion of storage space that is not allocated to the original RAID that has been configured resides on just one physical storage device, then the cache may be configured as a non-RAID logical volume. As another example, even if the portion of unallocated storage space resides on more than one physical storage device, the cache may be configured to use just the unallocated storage space that resides on one of these storage devices.

As a third example, also if the portion of unallocated storage space resides on multiple physical storage devices, the cache may be configured as an array of these storage devices, but not as a RAID. For instance, the cache may be configured as a logical volume spanning these storage devices, in a manner other than RAID-0. Alternatively, the cache may be configured over multiple logical volumes corresponding to these storage devices, which are sometimes referred to as "just a bunch of disks" (JBOD).

Figure 10:
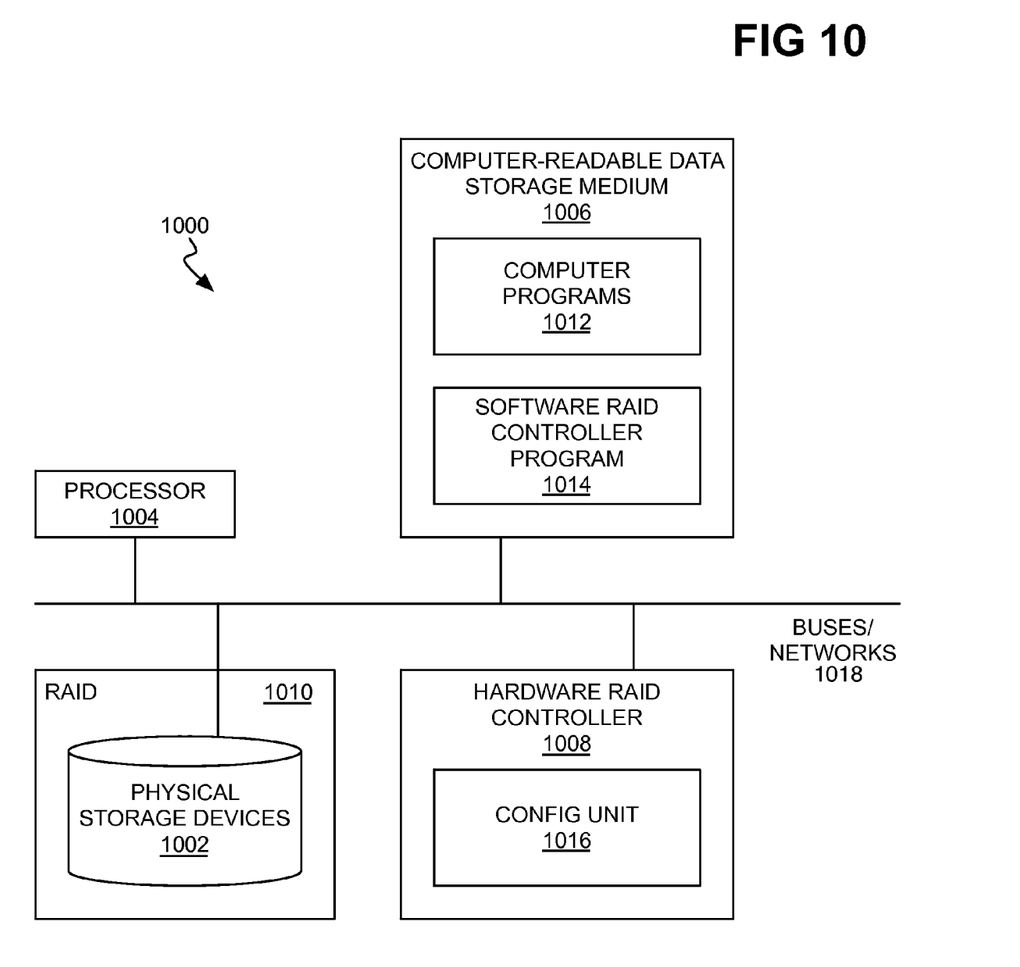
FIG. 10 is a diagram of a system, according to an embodiment of the present invention.

FIG. 10 shows a system 1000, according to an embodiment of the invention. The system 1000 includes at least physical storage devices 1002, a processor 1004, and a computer-readable data storage medium 1006. The system 1000 may further include a hardware RAID controller 1008. The physical storage devices 1002, the data storage medium 1006, and the hardware RAID controller 1008 (if present) are communicatively connected to one another via one or more buses and/or networks 1018.

The physical storage devices 1002 are configured as a RAID 1010, as has been described. The computer-readable data storage medium 1006 stores at least one or more computer programs 1012, and can also store a software RAID controller program 1014. The data storage medium 1006 may be a volatile or a non-volatile medium, and can be part of the physical storage devices 1002 in one embodiment. The processor 1004 executes the computer programs 1012 and the RAID controller program 1014 (if present).

Either the software RAID controller program 1014 or the hardware RAID controller 1008 is present within the system 1000 (or both). The software RAID controller program 1014 and the hardware RAID controller 1008 each can perform the methods that have been described. The hardware RAID controller 1008 particularly includes a configuration unit 1016, which is the hardware that performs the methods that have been described. The hardware RAID controller 1008 may be one or more of an integrated circuit (IC), an application-specific IC (ASIC), a field-programmable gate array (FPGA), or another type of hardware device that is hard-coded to perform the methods that have been described.

In one embodiment, the processor 1004 and the computer-readable data storage medium 1006 may be a computing device like a computer. In this embodiment, the physical storage devices 1002 may be part of this same computing device, such as in the same enclosure as the processor 1004 and the data storage medium 1006. In another embodiment, however, the physical storage devices 1002 may be part of a separate, external device to the computing device, within a separate housing.

In this latter embodiment, the configuration of the physical storage devices 1002 as the RAID 1010 may be achieved in one of two ways. First, the physical storage devices 1002 may appear as separate storage devices to the computing device, such that the configuration thereof as the RAID 1010 is performed by the software RAID controller program 1014. Second, the physical storage devices 1002 may appear as a single logical volume to the computing device. In this scenario, the hardware RAID controller 1008 configures the physical storage devices 1002 as the RAID 1010, and the computing device interacts with the RAID 1010 through the hardware RAID controller 1008.

In the former embodiment, then, the RAID configuration functionality described herein is achieved in a combination of hardware and software, by the processor 1004 executing the software RAID controller program 1014 in relation to the physical storage devices 1002. In the latter embodiment, the RAID configuration functionality described herein is achieved completely in hardware, by the hardware RAID controller 1008. In general, the latter embodiment may provide for certain performance benefits over the former embodiment, whereas the former embodiment is more easily upgraded and modified as compared to the latter embodiment.

Those of ordinary skill within the art can appreciate that a system, method, or computer program product may embody aspects of the present disclosure. Accordingly, aspects of the embodiments of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product that one or more computer readable medium(s) embody. The computer readable medium(s) may embody computer readable program code.

Those of ordinary skill within the art can utilize any combination of one or more computer readable medium(s). The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. An appropriate medium may transmit program code embodied on a computer readable medium. Such appropriate media include but are not limited to wireless, wireline, optical fiber cable, RF, etc., or any suitable combination of the foregoing.

In general, a computer program product includes a computer-readable medium on which one or more computer programs are stored. One or more processors of one or more hardware devices execute the computer programs from the computer-readable medium to perform a method. For instance, the processors may perform one or more of the methods that have been described above.

The computer programs themselves include computer program code. Those of ordinary skill within the art may write computer program code for carrying out operations for aspects of the present disclosure in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, any type of network may connect the remote computer to the user's computer. Such networks include a local area network (LAN) or a wide area network (WAN), or a connection may to an external computer (for example, through the Internet using an Internet Service Provider).

The detailed description has presented aspects of the present disclosure with reference to flowchart illustrations and/or block diagrams of methods, apparatus (systems) and computer program products according to embodiments of the disclosure. Those of ordinary skill within the art can understand that computer program instructions can implement each block of the flowchart illustrations and/or block diagrams, and combinations of blocks in the flowchart illustrations and/or block diagrams. Providing these instructions to a processor of a general purpose computer, special purpose computer, or other programmable data processing apparatus to produce a machine, can result in execution of the instructions via the processor of the computer or other programmable data processing apparatus, to create means for implementing the functions/acts specified in the flowchart and/or block diagram block or blocks.

A computer readable medium may also store these instruction to direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Those of ordinary skill within the art may also load the computer program instructions onto a computer, other programmable data processing apparatus, or other devices to cause the computer, other programmable apparatus or other devices, to perform a series of operational steps. The result is a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, execution of two blocks shown in succession may, in fact, occur substantially concurrently, or sometimes in the reverse order, depending upon the functionality involved. Special purpose hardware-based systems that perform specified functions or acts, or combinations of special purpose hardware and computer instructions, can implement each block of the block diagrams and/or flowchart illustration, and combinations of blocks in the block diagrams and/or flowchart illustration.

Although the detailed description has presented specific embodiments, those of ordinary skill in the art can appreciate that they can substitute any arrangement calculated to achieve the same purpose for the specific embodiments shown. This application thus covers any adaptations or variations of embodiments of the present disclosure. As such and therefore, only the claims and equivalents thereof limit this disclosure.

We claim:

1. A method comprising:
   configuring, by a device, a plurality of physical storage devices greater in number than two as a redundant array of independent disks (RAID) according to a RAID scheme in which a same amount of storage space on each physical storage device is allocated to the RAID, one of the physical storage devices having more storage space than other of the physical storage devices, resulting in the physical storage device having the more storage space having a first storage space allocated to the RAID and a second storage space not allocated to the RAID and unusable by the RAID;
   in response to the physical storage devices now including a failed physical storage device other than the physical storage device having the more storage space,
      configuring the second storages ace of the physical storage device having the more storage space that is not allocated to the RAID and unusable by the RAID as a temporary storage space for the RAID, the RAID being rebuilt after installation of a replacement physical storage device for the failed physical storage device, rebuilding of the RAID resulting in the RAID being rebuilt on all the physical storage devices that have been configured as the RAID, including the physical storage device having the more storage space and excluding the failed physical storage device;
      while the RAID is being rebuilt, receiving data from a requestor for writing to the RAID but writing the data instead to the temporary storage space and responding back to the requestor that the data has been written to the RAID even though the data has been written to the temporary storage space; and
      after the RAID has been rebuilt, copying the data written to the temporary storage space on just the given physical storage device to the RAID as a whole, and reconfiguring the the second storage space of the physical storage device having the more storage space that is not allocated to the RAID to again be unusable,
   wherein the second storage space not allocated to the RAID is part of the physical storage device having the more storage space and also having the first storage space allocated to the RAID, the method leveraging the second storage space that otherwise is unusable to instead be temporarily employed as the temporary storage space during rebuilding of the RAID, improving performance of writing to the RAID while the RAID is being rebuilt.

2. The method of claim 1, wherein configuring the physical storage devices as the RAID comprises:
   determining a given physical storage device of the physical storage devices that has a storage size no greater than that of any other physical storage device of the physical storage devices, the storage size of the given physical storage device being a smallest storage size of any physical storage device of the physical storage devices; and,
   for each physical storage device of the physical storage devices, allocating a first amount of the storage size of the physical storage device to the RAID, the first amount equal to the smallest storage size,
   wherein for each physical storage device of the physical storage devices of which the storage size is greater than the smallest storage size, a second amount of the storage size of the physical storage device is not allocated to the RAID, the second amount equal to the first amount of the storage size of the physical storage device allocated to the RAID minus the smallest storage size, and wherein for each physical storage device of the physical storage devices of which the storage size is equal to the smallest storage size, the second amount is equal to zero.

3. The method of claim 1, wherein the RAID is a first RAID, and the method further comprises configuring the portion of the storage space that is not allocated to the first RAID by:

where the portion of the storage space of the physical storage devices that is not allocated to the first RAID resides over more than one of the physical storage devices, configuring the portion of the storage space of the physical storage devices that is not allocated to the first RAID as a second RAID.

4. The method of claim 1, wherein a currently unallocated portion of the storage space of the physical storage devices is initially equal to the portion of the storage space of the physical storage devices that is not allocated to the RAID, and wherein the method further comprises configuring the portion of the storage space that is not allocated to the RAID by:

as an entry point of the method, where the currently unallocated portion of the storage space resides over more than one of the physical storage devices, configuring the currently unallocated portion of the storage space as an additional RAID, such that the currently unallocated portion of the storage space is reduced and/or eliminated.

5. The method of claim 4, wherein configuring the portion of the storage space that is not allocated to the RAID further comprises:

after configuring the currently unallocated portion of the storage space as the additional RAID, where the currently unallocated portion is reduced but not eliminated, repeating the method at the entry point.

6. The method of claim 4, wherein configuring the currently unallocated portion of the storage space as the additional RAID comprises:

configuring the currently unallocated portion of the storage space as the additional RAID in a manner that maximally uses the currently unallocated portion of the storage space.

7. The method of claim 4, wherein configuring the portion of the storage space that is not allocated to the RAID further comprises:

setting a current RAID level to a first RAID level of a predetermined sequence of RAID levels, wherein configuring the currently unallocated portion of the storage space as the additional RAID comprises:

configuring the currently unallocated portion of the storage space as the additional RAID in correspondence with the current RAID level; and, advancing the current RAID level to a next RAID level within the predetermined sequence of RAID levels.

8. The method of claim 4, wherein configuring the portion of the storage space that is not allocated to the RAID further comprises:

where the currently unallocated portion of the storage space resides on just one of the physical storage devices, configuring the currently unallocated portion of the storage space as a non-RAID logical volume, such that the currently unallocated portion is eliminated.

9. The method of claim 1, further comprising configuring the portion of the storage space that is not allocated to the RAID by:

configuring the portion of the storage space that is not allocated to the RAID as a cache for the RAID.

10. The method of claim 9, further comprising:

receiving from a requestor data to store on the RAID, by the device;

storing the data within the cache for the RAID, by the device;

after the data has been stored within the cache for the RAID;

immediately sending the requestor an acknowledgment that the data has been stored on the RAID even though the data has just been stored within the cache for the RAID and not yet on the RAID itself; and, at a later point in time, moving the data from the cache to the RAID so that the data is ultimately stored on the RAID.

11. A system comprising:

a plurality of physical storage devices greater in number than two and configurable as a redundant array of independent disks (RAID) according to a RAID scheme in which a same amount of storage space on each physical storage device is allocated to the RAID, one of the physical storage devices having more storage space than other of the physical storage devices, resulting in the physical storage device having the more storage space having a first storage space allocated to the RAID and a second storage space not allocated to the RAID and unusable by the RAID; and a controller to, in response to the physical storage devices now including a failed physical storage device other than the physical storage device having the more storage space, configure the second storage space of the physical storage device having the more storage space that is not allocated to the RAID and unusable by the RAID as a temporary storage space for the RAID, the RAID being rebuilt after installation of a replacement physical storage device for the failed physical storage device, rebuilding of the RAID resulting in the RAID being rebuilt on all the physical storage devices that have been configured as the RAID, including the physical storage device having the more storage space and excluding the failed physical storage device;

while the RAID is being rebuilt, receive data from a requestor for writing to the RAID but writing the data instead to the temporary storage space and responding back to the requestor that the data has been written to the RAID even though the data has been written to the temporary storage space; and after the RAID has been rebuilt, copy the data written to the temporary storage space on just the given physical storage device to the RAID as a whole, and reconfigure the second storage space of the physical storage device having the more storage space that is not allocated to the RAID to again be unusable, wherein the second storage space not allocated to the RAID is part of the physical storage device having the more storage space and also having the first storage space allocated to the RAID, the method leveraging the second storage space that otherwise is unusable to instead be temporarily employed as the temporary storage space during rebuilding of the RAID, improving performance of writing to the RAID while the RAID is being rebuilt.

12. The system of claim 11, further comprising an enclosure housing at least the physical storage devices,
wherein the controller is one of (a) housed within the enclosure and (b) part of a device separate from the enclosure.

13. A hardware controller for a plurality of physical storage devices greater in number than two and configurable as a redundant array of independent disks (RAID) according to a RAID scheme in which a same amount of storage space on each physical storage device is allocated to the RAID, one of the physical storage devices having more storage space than other of the physical storage devices, resulting in the physical storage device having the more storage space having a first storage space allocated to the RAID and a second storage space not allocated to the RAID and unusable by the RAID, the hardware controller comprising:
  a unit implemented in hardware to, in response to the physical storage devices now including a failed physical storage device other than the physical storage device having the more storage space,
    configure the second storage space of the physical storage device having the more storage space that is not allocated to the RAID and unusable by the RAID as a temporary storage space for the RAID, the RAID being rebuilt after installation of a replacement physical storage device for the failed physical storage device, rebuilding of the RAID resulting in the RAID being rebuilt on all the physical storage devices that have been configured as the RAID, including the physical storage device having the more storage space and excluding the failed physical storage device;
    while the RAID is being rebuilt, receive data from a requestor for writing to the RAID but writing the data instead to the temporary storage space and responding back to the requestor that the data has been written to the RAID even though the data has been written to the temporary storage space; and
    after the RAID has been rebuilt, copy the data written to the temporary storage space on just the given physical storage device to the RAID as a whole, and reconfigure the second storage space of the physical storage device having the more storage space that is not allocated to the RAID to again be unusable,
  wherein the second storage space not allocated to the RAID is part of the physical storage device having the more storage space and also having the first storage space allocated to the RAID, the method leveraging the second storage space that otherwise is unusable to instead be temporarily employed as the temporary storage space during rebuilding of the RAID, improving performance of writing to the RAID while the RAID is being rebuilt.

14. A computer program product comprising:
  a hardware storage device storing computer-readable code executable by a processor in relation to a plurality of physical storage devices greater in number than two and configurable as a redundant array of independent disks (RAID) according to a RAID scheme in which a same amount of storage space on each physical storage device is allocated to the RAID, one of the physical storage devices having more storage space than other of the physical storage devices, resulting in the physical storage device having the more storage space having a first storage space allocated to the RAID and a second storage space not allocated to the RAID and unusable by the RAID,
  wherein the computer-readable code is to, in response to determining that the physical storage devices now includes a failed physical storage device other than the physical storage device having the more storage space,
    configure the second storage space of the physical storage device having the more storage space that is not allocated to the RAID and unusable by the RAID as a temporary storage space for the RAID, the RAID being rebuilt after installation of a replacement physical storage device for the failed physical storage device, rebuilding of the RAID resulting in the RAID being rebuilt on all the physical storage devices that have been configured as the RAID, including the physical storage device having the more storage space and excluding the failed physical storage device;
    while the RAID is being rebuilt, receive data from a requestor for writing to the RAID but writing the data instead to the temporary storage space and responding back to the requestor that the data has been written to the RAID even though the data has been written to the temporary storage space; and
    after the RAID has been rebuilt, copy the data written to the temporary storage space on just the given physical storage device to the RAID as a whole, and reconfigure the second storage space of the physical storage device having the more storage space that is not allocated to the RAID to again be unusable,
  wherein the second storage space not allocated to the RAID is part of the physical storage device having the more storage space and also having the first storage space allocated to the RAID, the method leveraging the second storage space that otherwise is unusable to instead be temporarily employed as the temporary storage space during rebuilding of the RAID, improving performance of writing to the RAID while the RAID is being rebuilt.

15. The method of claim 1, wherein the RAID that is being rebuilt is the RAID that included the failed physical storage device.

16. The method of claim 1, wherein the RAID for which data is received for writing but that is instead written to the temporary storage space is the RAID that is being rebuilt.

17. The method of claim 1, wherein the RAID has a same size after being rebuilt than before the RAID was rebuilt.

18. The method of claim 1, further comprising, prior to the physical storage devices including the failed physical storage device and prior to the RAID being rebuilt, receiving data for writing to the RAID and writing the data to the RAID,
  wherein the RAID that is being rebuilt is the RAID that included the failed physical storage device,
  wherein the RAID for which data is received for writing but that is instead written to the temporary storage space is the RAID that is being rebuilt,
  and wherein the RAID has a same size after being rebuilt than before the RAID was rebuilt.

* * * * *